United States Patent [19]

Taguchi

[11] Patent Number: 4,559,842
[45] Date of Patent: Dec. 24, 1985

[54] MOUNTING SETUP OF GOVERNOR SHAFT

[75] Inventor: Hiromi Taguchi, Zama, Japan

[73] Assignee: Nissan Motor Co., Ltd., Yokohama, Japan

[21] Appl. No.: 544,207

[22] Filed: Oct. 21, 1983

[51] Int. Cl.[4] .............................. F16H 5/46
[52] U.S. Cl. ............................ 74/336.5; 137/56
[58] Field of Search ............... 74/336.5; 137/56;
403/378, 379; 411/356, 352, 357, 511, 516, 530;
384/129, 283, 296, 428

[56] References Cited

U.S. PATENT DOCUMENTS

| | | | |
|---|---|---|---|
| 1,900,366 | 3/1933 | Riebel, Jr. et al. | 403/378 X |
| 2,181,963 | 12/1939 | Carter et al. | 74/336.5 X |
| 2,596,821 | 5/1952 | Parkins | 403/379 X |
| 3,076,350 | 2/1963 | Boguslawski | 74/336.5 |
| 3,796,464 | 3/1974 | Hansen et al. | 403/378 X |
| 4,424,826 | 1/1984 | Kuusik | 137/56 X |

FOREIGN PATENT DOCUMENTS 385806 12/1923 Fed. Rep. of Germany ...... 403/378

Primary Examiner—James C. Yeung
Attorney, Agent, or Firm—Jeffery, Schwaab, Mack, Blumenthal & Evans Schwartz

[57] ABSTRACT

A governor shaft for supporting a governor valve is rotatably supported to a transmission case by a stopper pin. The governor shaft is formed with an annular groove having a rectangular cross section. The stopper pin is inserted through the transmission case, and engaged with the annular groove of the governor shaft for preventing the governor shaft from being extracted and allowing the rotation of the governor shaft. The stopper pin has two cylindrical portions and a middle portion lying between the cylindrical portions. The middle portion is received in the annular groove, and the cylindrical portions are supported by the transmission case. In one embodiment of the present invention, the middle portion has a square cross section, so that the stopper pin tends to be in face contact with the annular groove. The cylindrical portions are arranged to allow the stopper pin to rotate to a limited extent.

9 Claims, 8 Drawing Figures

MOUNTING SETUP OF GOVERNOR SHAFT

BACKGROUND OF THE INVENTION

The present invention relates to an arrangement for mounting a rotary shaft on a stationary support. The arrangement is especially suitable for mounting of a governor shaft to a case of an automatic transmission of an automobile.

A governor is driven by a rotating member of a transmission, and produces a governor fluid pressure which varies in relation with vehicle speed. A governor shaft transmits rotation from the rotating member of the transmission to a governor valve assembly. The governor shaft is usually formed with an annular groove. A stopper pin is inserted through the transmission case from the outside, and engaged with the annular groove of the governor shaft in order to prevent the governor shaft from being axially extracted. The stopper pin allows the governor shaft to rotate but prevents the governor shaft from moving axially out of position. Usually, the stopper pin has a cylindrical shape, so that the stopper pin makes contact with the annular groove of the governor shaft along a line. Along this line of contact, load is localized, and wear between the stopper pin and the rotating governor shaft is accelerated. Therefore, the stopper pin is liable to break because of severe wear caused during a long period of use.

SUMMARY OF THE INVENTION

It is an object of the present invention to provide a mounting setup of a governor shaft, which is arranged to increase the contacting area between the stopper pin and the governor shaft so as to reduce wear, and which is therefore superior in durability and reliability.

According to the present invention, a governor shaft for supporting and rotating a governor valve assembly is rotatably supported by a transmission case. The governor shaft is formed with an annular groove which encircles the axis of the governor shaft, and has a bottom, and first and second side walls. The first and second side wall are flat. There is provided a stopper pin for preventing the governor shaft from being axially extracted while allowing the governor shaft to rotate. The stopper pin has first and second cylindrical portions and a middle portion lying between the first and second cylindrical portions. The first and second cylindrical portions are rotatably supported by the transmission case. The middle portion is received in the annular groove of the governor shaft so as to limit the axial movement of the governor shaft. The middle portion has at least one flat face capable of abutting on one of the first and second flat side walls. Preferably, the cross section of the middle portion is square or rectangular, and the cross section of the annular groove is rectangular.

DETAILED DESCRIPTION OF THE INVENTION

Figure 1:
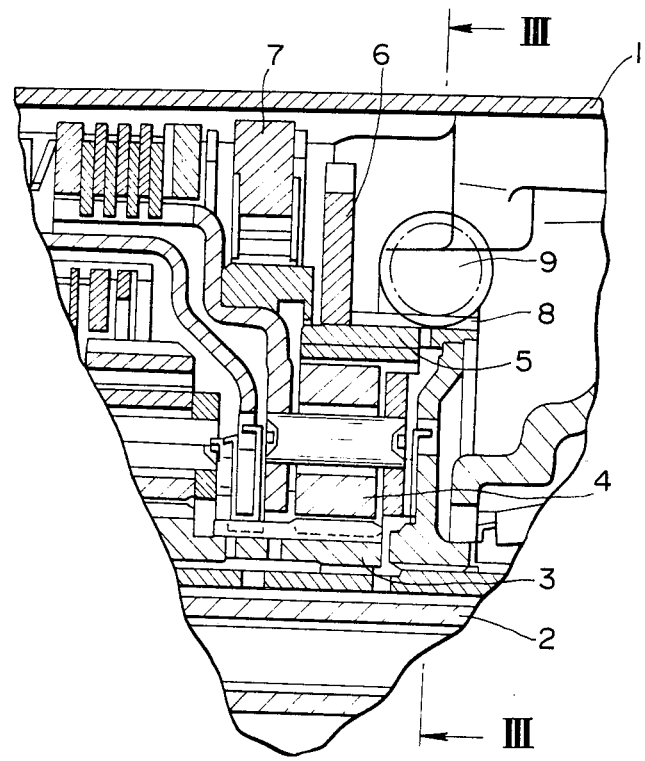
FIG. 1 is a fragmentary sectional view of an automatic transmission including a governor.

The position of a governor in an automatic transmission is shown in FIG. 1. In FIG. 1, an input shaft 2 is mounted in a transmission case 1. There are provided a forward planetary unit (not shown) and a low and reverse planetary unit which is adjacent to the forward planetary unit. The low and reverse planetary unit comprises a sun gear 3, pinion 4 and a ring gear 5. There are further provided a parking gear 6 and a one-way clutch 7. The ring gear 5 has a worm 8 formed on the outer periphery. The ring gear 5 drives a governor through the worm 8.

Figure 2:
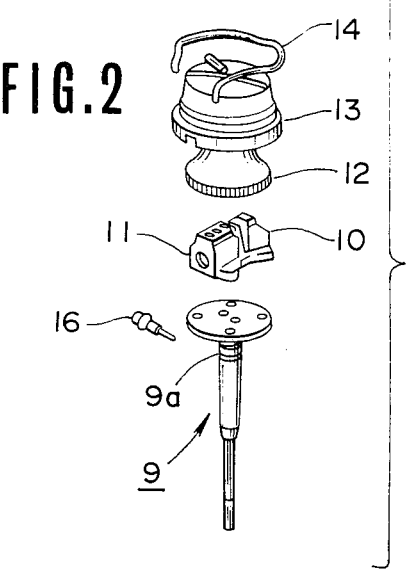
FIG. 2 is a exploded perspective view of the governor.
Figure 3:
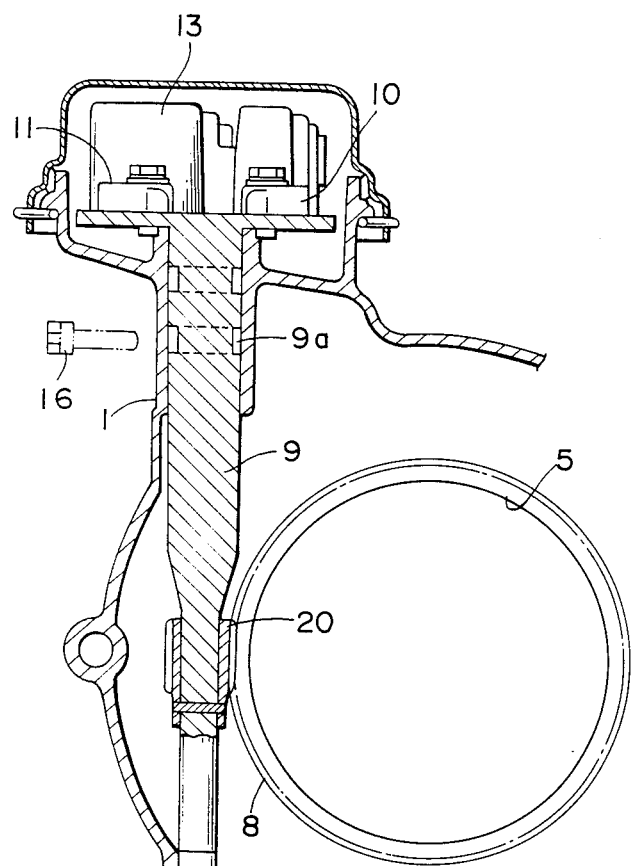
FIG. 3 is a fragmentary sectional view taken along a line III—III of FIG. 1.

The construction of the governor is shown in FIG. 2 in an exploded state, and in FIG. 3 is an assembled state. A governor shaft 9 has a pinion 20 which is in mesh with the worm 8 of the ring gear 5. When the ring gear 5 rotates, the worm 8 and the pinion 20 cause the governor shaft 9 to rotate. Primary and secondary governor valves 10 and 11 are fixed to a top end of the governor shaft 9. The primary and secondary governor valves 10 and 11 are covered by a governor cap 13. Reference numeral 12 is a seal ring, and reference numeral 14 is a snap ring. The governor shaft 9 causes the primary and secondary governor valves 10 and 11 to rotate when the ring gear 5 rotates. Through the action of centrifugal force, the primary and secondary governor valves 10 and 11 produce a governor fluid pressure which varies in relation to vehicle speed.

Figure 4:
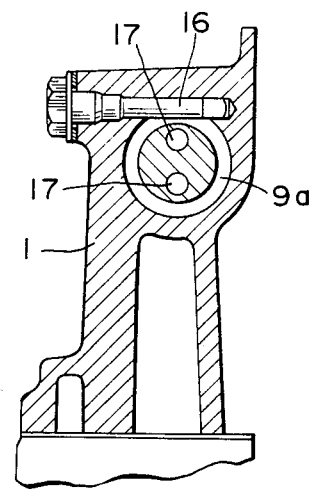
FIG. 4 is a fragmentary sectional view showing the arrangement of a governor shaft, a stopper pin, and a transmission case.

The governor shaft 9 is formed with an annular groove 9a. A stopper pin 16 is inserted through the transmission case 1 from the outside, and is engaged with the annular groove 9a, as shown in FIG. 4. Thus, the stopper pin 16 prevents the governor shaft 9 from being extracted axially. A reference numeral 17 denotes a pressurized oil passage.

Figure 5:
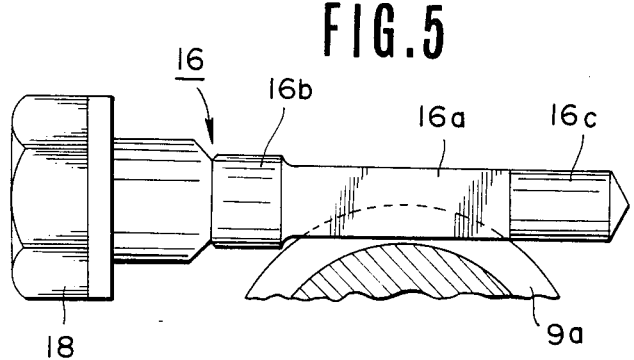
FIG. 5 is an enlarged plan view of the stopper pin.
Figure 6:
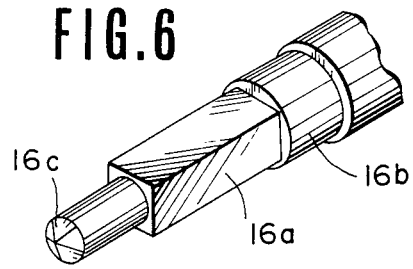
FIG. 6 is a perspective view of a portion of the stopper pin.
Figure 7:
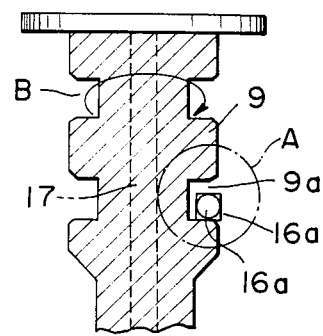
FIG. 7 is a longitudinal sectional view of the governor shaft.

The shape of the stopper pin is shown in FIGS. 5 and 6. The stopper pin 16 has a middle portion 16a and first and second cylindrical portions 16b and 16c. The middle portion 16a lies between the first and second cylindrical portions 16b and 16c. The stopper pin 16 further has a head 18. In this embodiment, the middle portion 16a of the stopper pin 16 has a square cross sectional shape. The annular groove 9a is rectangular in cross section, and has two flat side walls and a flat bottom extending between the two side walls. As shown in FIG. 7 within a circle A, one flat surface of the middle portion 16a of the stopper pin 16 abuts on one flat side wall of the annular groove 9a. The cylindrical portions 16b and 16c are received in holes formed in the transmission case 1. Thus, the stopper pin 16 is supported, at the cylindrical portions 16b and 16c, by the transmission case 1. The stopper pin 16 is allowed to rotate to some extend by the cylindrical portions 16b and 16c.

Figure 8:
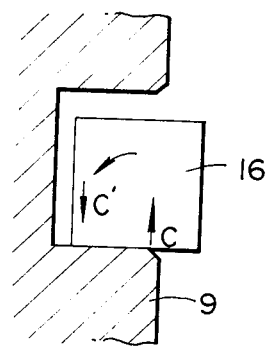
FIG. 8 is an enlarged view of a portion of FIG. 7.

During operation, the rotation of the ring gear 5 is transmitted through the worm 8 and the pinion 20 to the governor shaft 9. Thus, the governor shaft 9 rotates the governor valves 10 and 11. During the rotation of the governor shaft 9, the annular groove 9a and the middle portion 16a of the stopper pin 16 are held in face contact because of the configuration of the middle portion 16a and the annular groove 9a, and the slight rotation of the stopper pin 16 allowed by the cylindrical portions 16b and 16c. This is, the middle portion 16a of the stopper pin 16 tends to make contact with the annular groove 9a, not along a line, but on a face. If a force shown by an arrow C in FIG. 8 is exerted on the stopper pin 16, the stopper pin 16 slightly rotates, and the force is fed back and absorbed as shown by an arrow C' in FIG. 8, so as to maintain the face contact between the middle portion 16a of the stopper pin 16 and the annular groove 9a. In order to reduce the frictional resistance, a lubricating oil is supplied to the contacting areas between the stopper pin 16 and the annular groove 9a. In this way, the pressure between the stopper pin 16 and the governor shaft 9 is reduced, and the amount of wear of the contacting parts is remarkably reduced as compared with the conventional construction having a line contact. There is almost no possibility of breakage of the stopper pin due to wear during a long period of use, and the reliability of the governor mounting is improved.

What is claimed is:

1. An automatic transmission comprising:
   governor valve means for producing a governor pressure,
   a governor driving member driven by a torque transmitted through the transmission,
   a transmission case,
   a governor shaft rotatably supported on said transmission case for supporting and rotating said governor valve assembly, said governor shaft being connected with said governor driving member so that rotation of said governor driving member causes said governor shaft to rotate, said governor shaft being formed with an annular groove which encircles the axis of said governor shaft, and has a bottom, and first and second side walls, said first and second side walls being flat, and
   a stopper pin for preventing said governor shaft from being axially extracted from said transmission case and allowing said governor shaft to rotate, said stopper pin having first and second cylindrical portions and a middle portion lying between said first and second cylindrical portions, said first and second cylindrical portions being rotatably supported by said transmission case, said middle portion being received in said annular groove so as to limit the axial movement of said governor shaft, said middle portion having at least one flat face capable of abutting on one of said first and second flat side walls.

2. An automatic transmission to claim 1, wherein said middle portion has a quadrilateral cross section.

3. An automatic transmission according to claim 2, wherein said middle portion has a rectangular cross section.

4. An automatic transmission according to claim 3, wherein said first and second flat side walls of said annular groove are substantially parallel to each other, and substantially normal to the axis of said governor shaft.

5. An automatic transmission according to claim 4, wherein said middle portion has a square cross section.

6. An automatic transmission according to claim 5, wherein said stopper pin is allowed to rotate relative to said transmission case to a limited extent.

7. An automatic transmission according to claim 6, wherein said bottom of said annular groove is flat, and the cross section of said annular groove is rectangular.

8. An automatic transmission according to claim 1, wherein said stopper pin is inserted into said transmission case from the outside, and extends substantially in a plane perpendicular to said governor shaft.

9. An automatic transmission according to claim 8, wherein said governor shaft is extractible only in a first axial direction, a movement of said governor shaft in a second axial direction opposite to said first direction being limited by said transmission case, a movement of said governor shaft in said first direction being limited by said stopper pin.

* * * * *